United States Patent
Yano

(10) Patent No.: US 9,154,682 B2
(45) Date of Patent: Oct. 6, 2015

(54) METHOD OF DETECTING PREDETERMINED OBJECT FROM IMAGE AND APPARATUS THEREFOR

(75) Inventor: Kotaro Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 880 days.

(21) Appl. No.: 12/412,158

(22) Filed: Mar. 26, 2009

(65) Prior Publication Data

US 2009/0245578 A1    Oct. 1, 2009

(30) Foreign Application Priority Data

Mar. 28, 2008    (JP) ................. 2008-086960

(51) Int. Cl.
*G06K 9/00*    (2006.01)
*G06K 9/62*    (2006.01)
*H04N 5/232*    (2006.01)

(52) U.S. Cl.
CPC ............ H04N 5/232 (2013.01); G06K 9/00778 (2013.01); G06K 9/6227 (2013.01); *G06K 2209/21* (2013.01); *G06T 2207/30196* (2013.01); *G06T 2207/30232* (2013.01); *G06T 2207/30244* (2013.01)

(58) Field of Classification Search
CPC ............ G06K 9/00778; G06K 9/6227; G06K 2209/21; G06T 2207/30196; G06T 2207/30232; G06T 2207/30244; H04N 5/232
See application file for complete search history.

(56) References Cited

U.S. PATENT DOCUMENTS

| | | | |
|---|---|---|---|
| 6,181,805 B1 * | 1/2001 | Koike et al. ................. | 382/118 |
| 7,123,754 B2 * | 10/2006 | Matsuo et al. ............... | 382/118 |
| 7,382,895 B2 * | 6/2008 | Bramblet et al. ............ | 382/103 |
| 8,121,348 B2 * | 2/2012 | Hayasaka et al. ............ | 382/103 |
| 8,213,690 B2 * | 7/2012 | Okada et al. ................. | 382/118 |
| 2004/0257444 A1 * | 12/2004 | Maruya et al. ............... | 348/169 |
| 2007/0039030 A1 * | 2/2007 | Romanowich et al. ....... | 725/105 |

FOREIGN PATENT DOCUMENTS

| | | |
|---|---|---|
| JP | 4-199487 A | 7/1992 |
| JP | 09-081889 A | 3/1997 |
| JP | 2007-241637 A | 9/2007 |

OTHER PUBLICATIONS

Bernadin et al., "Multimodal Identity Tracking in a Smartroom", 2006, IFIP International Federation for Information Processing, vol. 204, Artificial Intelligence Applications and Innovations, 324-336.*
Rowley et al, "Neural network-based face detection", IEEE Transactions on Pattern Analysis and Machine Intelligence, vol. 20, No. 1, Jan. 1998.
Viola and Jones, "Rapid Object Detection using Boosted Cascade of Simple Features", Proceedings of the IEEE Conference on Computer Vision and Pattern Recognition (CVPR'01).

* cited by examiner

*Primary Examiner* — Katrina Fujita
(74) *Attorney, Agent, or Firm* — Canon U.S.A., Inc. IP Division

(57) ABSTRACT

In an object detecting method, an imaging condition of an image pickup unit is determined, a detecting method is selected based on the determined imaging condition, and at least one predetermined object is detected from an image picked up through the image pickup unit according to the selected detecting method.

7 Claims, 10 Drawing Sheets

METHOD OF DETECTING PREDETERMINED OBJECT FROM IMAGE AND APPARATUS THEREFOR

BACKGROUND OF THE INVENTION

1. Field of the Invention

The present invention relates to an object detecting method provided to detect a predetermined object such as a foot passenger from an image picked up through an image pickup device and an apparatus therefor.

2. Description of the Related Art

In recent years, the installation of monitoring cameras in shops for the sake of security has become widespread rapidly. Further, it has been proposed that the above-described cameras should be used for not only acquiring video, but automatically counting the number of people going in and out of a shop and/or people passing near the shop so that data obtained through the camera can be used for a marketing research of the shop.

A technology of counting foot passengers existing in a predetermined area from video data acquired through a camera has been disclosed in Japanese Patent Laid-Open No. 4-199487. According to the above-described document, a camera 2 is installed above a passage so that the camera 2 points directly below, as shown in FIG. 2. Since the shape of the head of a person 1 viewed from the camera 2 installed above is a circle, a person can be detected and counted by extracting data of a circular object from video data obtained through the camera 2.

On the other hand, in the recent years, technologies for detecting face data from image data by using the technologies proposed in the following documents, that is, Rowley et al, "Neural network-based face detection", IEEE TRANSACTIONS ON PATTERN ANALYSIS AND MACHINE INTELLIGENCE, VOL. 20, NO. 1, Jan. 1998, and Viola and Jones, "Rapid Object Detection using Boosted Cascade of Simple Features", Proceedings of the IEEE Conference on Computer Vision and Pattern Recognition (CVPR'01) have become commercially practical. The use of the above-described technologies allows for installing a camera 4 forward of a passage as shown in FIG. 3 and detecting face data from video data obtained through the camera 4 so that a person 3 can be counted.

However, for counting people, a pattern of the identification target varies according to whether a camera installed on the ceiling is used to count people passing directly below the camera or a camera installed at the side of a passage is used to count people crossing the field of vision. Therefore, identification functions used to perform the people counting also vary. Accordingly, contrary to expectations, where the camera should be installed has been restricted depending on identification functions implemented on a system.

SUMMARY OF THE INVENTION

The present invention allows for detecting an object by using an appropriate identification method according to an imaging condition.

According to one aspect of the present invention, an object detecting method is provided including the steps of determining an imaging condition of an image pickup unit, selecting a detecting method based on the determined imaging condition, and detecting at least one predetermined object from an image picked up through the image pickup unit according to the selected detecting method.

According to another aspect of the present invention, an object detecting device is provided including a determining unit configured to determine an imaging condition of an image pickup unit, a selecting unit configured to select a detecting method based on the determined imaging condition, and a detecting unit configured to detect at least one predetermined object from an image picked up through the image pickup unit according to the selected detecting method.

Other aspects and advantages besides those discussed above shall be apparent to those skilled in the art from the description of the embodiments of the invention which follows. In the description, reference is made to accompanying drawing, which form a part thereof, and which illustrate an example of the invention. Such example, however, is not exhaustive of the various embodiments of the invention, and therefore reference is made to the claims which follow the description for determining the scope of the invention.

DESCRIPTION OF THE EMBODIMENTS

Figure 1:
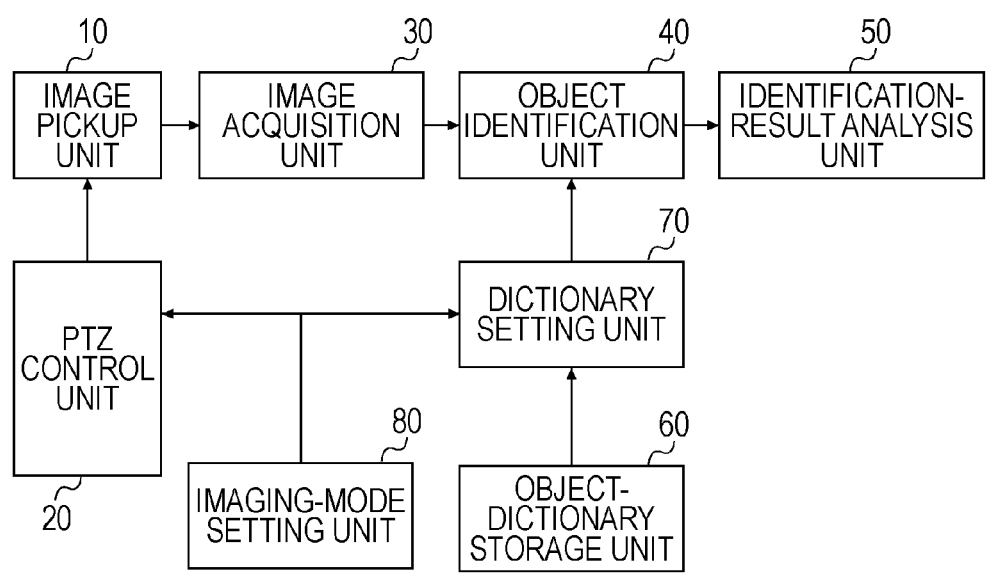
FIG. 1 illustrates a configuration of an object detecting device.

Hereinafter, various embodiments of the present invention will be described in detail with reference to the attached drawings. FIG. 1 shows a configuration of a first embodiment of the present invention.

An image pickup unit 10 includes an imaging lens and an image pickup sensor including a charge-coupled device (CCD), a complementary metal oxide semiconductor (CMOS), and so forth, and picks up an image showing an identification target. A pan tilt zoom (PTZ) control unit 20 horizontally and/or vertically moves the imaging direction of the image pickup unit 10 and changes the imaging magnification of the image pickup unit 10 by using a driving mechanism such as a motor. An image acquisition unit 30 acquires data of images picked up through the image pickup unit 10 at predetermined time intervals and output the image data in frames.

An object identification unit 40 identifies whether data of a desired object is included in the image data acquired through the image acquisition unit 30. An identification-result analysis unit 50 analyzes a result of the identification performed by the object identification unit 40 and transmits data of the analysis result to a display unit 126, for example, so that the display unit 126 displays the analysis result. An object-dictionary storage unit 60 is a memory storing data of the object dictionary corresponding to a desired identification target, the object dictionary being used by the object identification unit 40. The object dictionary data is obtained in advance through machine learning from many object patterns and classified by the imaging directions, the sizes, and so forth of the objects.

An object setting unit 70 selects data of a dictionary appropriate for the imaging condition of the object from the dictionary data stored in the object-dictionary storage unit 60 and sets the dictionary data to the object identification unit 40. An imaging-mode setting unit 80 makes imaging-mode settings by using a keyboard or the like of an input unit 124.

Figure 12:
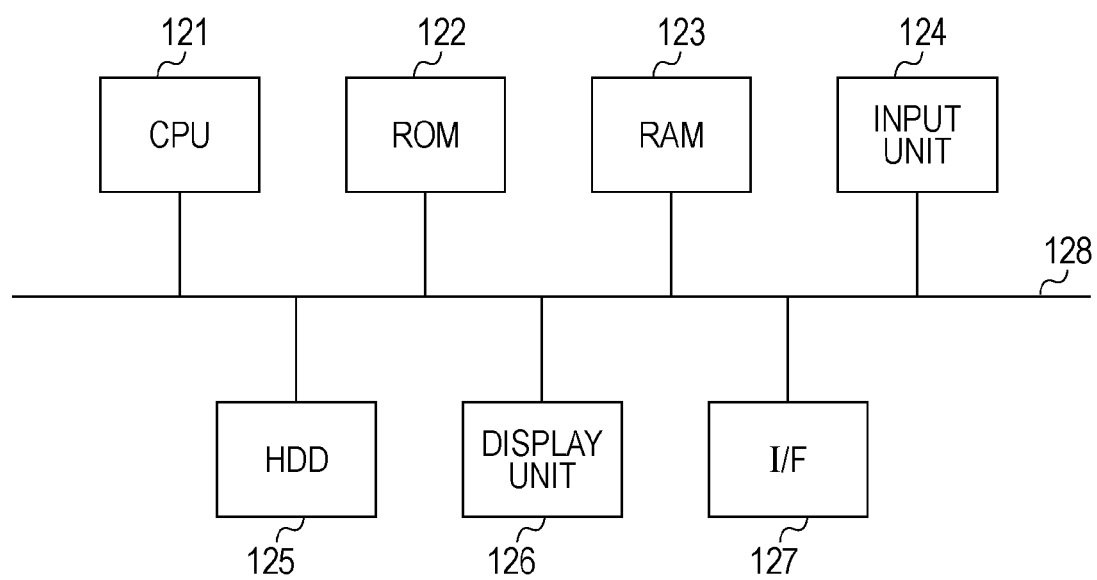
FIG. 12 is a diagram illustrating the hardware configuration of another object detecting device.

FIG. 12 is a diagram showing the hardware configuration of an object detecting device according to the above-described embodiment. A central processing unit (CPU) 121 executes various processing procedures by executing programs and controls each of the units of the object detecting device. A read only memory (ROM) 122 stores programs and/or various kinds of fixed data. A random access memory (RAM) 123 temporarily stores various kinds of data and/or programs, and presents a work area to the CPU 121. The CPU 121 executes a program stored in the ROM 122 and/or a program loaded from a hard disk drive (HDD) 125 to the RAM 123.

The input unit 124 includes a keyboard, a mouse, and so forth, so as to accept data and/or an instruction transmitted from a user. The HDD 125 stores programs, dictionary data, image data, and so forth in a nonvolatile manner. A display unit 126 displays input data, data of the processing result, and so forth. A compact-disk (CD) ROM drive or the like may be provided in place of the HDD 125.

An interface (I/F) 127 is connected to an image pickup device provided with a PTZ control mechanism, so as to receive data of an image picked up by the image pickup device and/or transmits an instruction generated to perform PTZ control, for example, to the image pickup device. A bus 128 is provided to connect the units of the device to one another.

Next, operations of the above-described embodiment will be described according to a processing flowchart shown in FIG. 4. First, in the above-described embodiment, settings are made so that a person 1 is shot from directly above through a camera 2 in an exemplary state shown in FIG. 2 and the number of people who pass through is counted. After that, a change is made so that a person 3 is shot from the oblique front through a camera 4 in an exemplary state shown in FIG. 3 and the number of people who pass through is counted.

Figure 2:
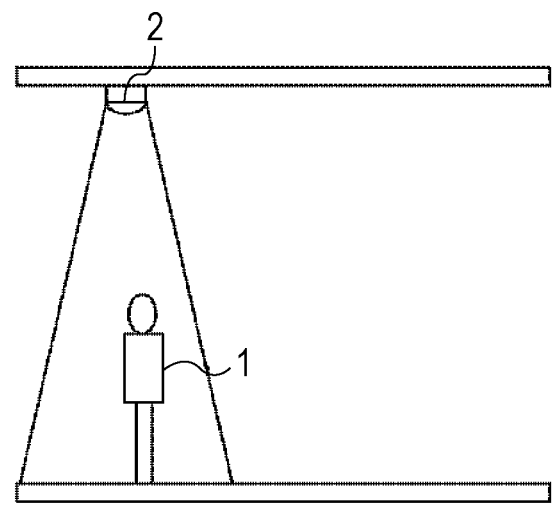
FIG. 2 is a diagram illustrating the state where a person is shot from above through a camera.

First, at step S101, the imaging-mode setting unit 80 selects imaging-from-above mode as its imaging mode, so as to shoot a person from above in the exemplary state shown in FIG. 2. In the above-described embodiment, there are two imaging modes including the imaging-from-above mode and imaging-from-front mode. Further, the object-dictionary storage unit 60 separately stores data of a dictionary provided to identify the pattern of a person viewed from directly above (a dictionary provided to identify circular objects) and data of a dictionary provided to identify the pattern of a person obliquely viewed from the upper front (a dictionary provided to identify faces).

In the imaging-from-above mode, the amount of driving the imaging lens is determined in advance so that the image pickup unit 10 shoots the area directly below the image pickup unit 10 and the data of the "dictionary provided to identify the patterns of persons viewed from directly above", the data being stored in the object-dictionary storage unit 60, is used. Further, in the imaging-from-front mode, the amount of driving the imaging lens is determined in advance so that the image pickup unit 10 shoots the area in front of the image pickup unit 10 and the data of the "dictionary provided to identify faces", the data being stored in the object-dictionary storage unit 60, is used.

In the above-described embodiment, the device operates in the two imaging modes. However, the amount of driving an imaging lens provided to shoot a person viewed from an angle between those shown in FIGS. 2 and 3 may be provided, and data of a dictionary provided to identify a person viewed from the above-described angle may be stored in the object-dictionary storage unit 60 so that the three imaging modes are provided. Further, the target for identification may not be limited to a person. Namely, the identification target may be switched between a person and a vehicle, for example, based on the imaging direction, for example.

Next, at step S102, the PTZ control unit 20 drives the image pickup unit 10 so that the image pickup unit 10 shoots the area directly below the image pickup unit 10 based on the imaging mode selected at step S101.

Next, at step S103, the dictionary setting unit 70 determines to use the "dictionary provided to identify the pattern of a person viewed from directly above", the data of the dictionary being stored in the object-dictionary storage unit 60, based on the imaging mode selected at step S101. The dictionary setting unit 70 transfers the above-described dictionary data to a dictionary memory provided in the object identification unit 40 and sets the dictionary data to the object identification unit 40.

Next, the image pickup unit 10 starts to perform imaging based on an instruction transmitted from the input unit 124 at step S104.

Next, at step S105, the image acquisition unit 30 acquires data of images picked up by the image pickup unit 10 at predetermined time intervals at step S105. The above-described image data is data of a two-dimensional arrangement of 8-bit pixels, for example, and includes data of three faces including a red (R) face, a green (G) face, and a blue (B) face. Further, in the above-described embodiment, the RGB data is converted into brightness image data used in the subsequent processing procedures. The brightness image data is transferred to the object identification unit 40 and stored in an image memory provided in the object identification unit 40. When YUV data is acquired as image data, a Y component may be determined to be the brightness image data, as it is.

Next, at step S106, the object identification unit 40 checks the image data transferred to the internal image memory against the dictionary data set by the dictionary setting unit 70, so as to identify a desired object. Here, the object identification is performed by using the method proposed by the above-described non-patent document "Neural network-based face detection" and/or the above-described non-patent document "Rapid Object Detection using Boosted Cascade of Simple Features". According to the above-described non-patent document "Neural network-based face detection", a face pattern shown in an image is detected through a neural network. Hereinafter, the above-described method will be briefly described.

First, image data selected as a target for the face detection is read into a memory, and data of a predetermined area checked against face data is cut from the read image data. Then, data of a distribution of the values of pixels provided in the cut area data is determined to be input data, and a single output data item is obtained by performing a calculation performed through the neural network. At that time, the weight and the threshold value of the neural network had already been learned based on many face image patterns and non-face image patterns. For example, if the value of data output from the neural network is 0 or more, the data is determined to be face data. Otherwise, the data is determined to be non-face data.

Figure 5:
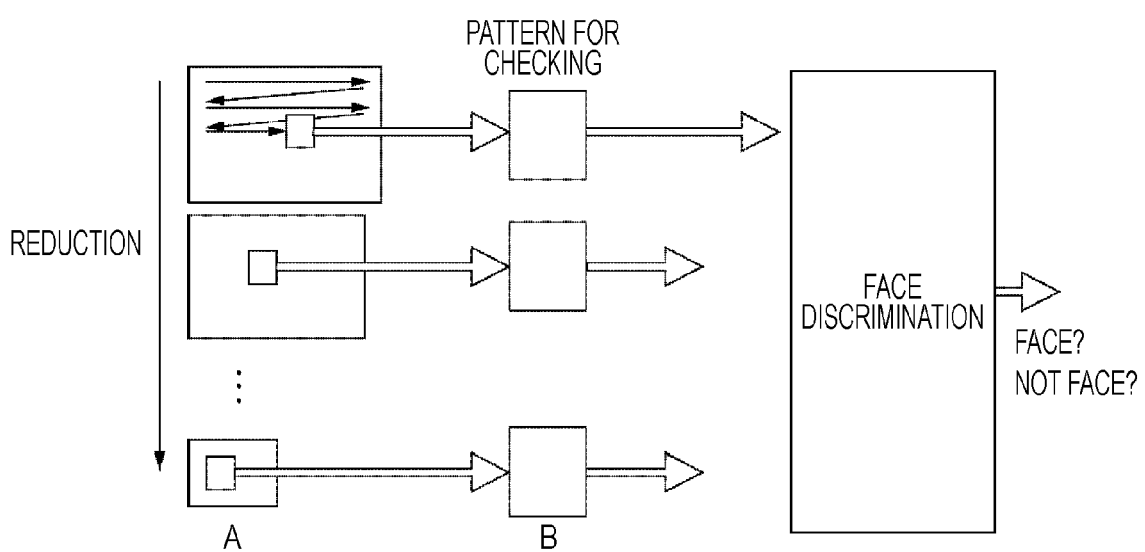
FIG. 5 is a diagram illustrating a method of searching for a face pattern from an image.

Then, sequential scanning is performed for the entire image data vertically and horizontally, as shown in FIG. 5, so as to vary the position where image-pattern data which is input to the neural network and checked against face data is cut. Accordingly, the face data is detected from the image data. Further, for detecting data of faces of various sizes, read image data items are sequentially downsized at a predetermined rate, as shown in FIG. 5, and the above-described face-detection scanning is performed for each of the downsized image data.

The above-described non-patent document "Rapid Object Detection using Boosted Cascade of Simple Features" has been proposed, as an example of speed enhancement of processing. According to the above-described non-patent document, the precision of the face discrimination is increased by efficiently combining many weak classifiers with one another by using AdaBoost. Further, each of the weak classifiers is generated by a Haar-type rectangle feature quantity, and the calculation of the rectangle feature quantity is performed with high speed by using an integral image.

Further, classifiers obtained through AdaBoost learning are connected in series so that a cascade-type face detector is provided. The above-described cascade-type face detector removes data of a pattern candidate clearly showing that the pattern candidate does not indicate a face by using a simple classifier provided in the preceding stage, that is, a classifier appropriate for a less calculation amount. Further, the above-described cascade-type face detector determines whether a face is indicated only for candidates other than the removed pattern candidate by using a sophisticated classifier that has an increased identification capability and that is provided in the post stage, that is, a classifier appropriate for an increased calculation amount. Accordingly, complicated determination may not be made for all of candidates so that the processing speed is increased.

Although each of the above-described non-patent documents describes the technology of detecting face data from image data, data of the shape of a person's head can also be detected from image data.

Next, at step S107, the identification-result analysis unit 50 analyzes the positional coordinates of the area of an object detected through the object identification unit 40, and temporarily stores data of the analysis result in an internal memory.

Similarly, the processing procedures corresponding to steps S105, S106, and S107 are performed again in frames of the next time. Then, at step S108, the identification-result analysis unit 50 counts the number of persons based on the object-identification result corresponding to two frames. The counting method will be described with reference to FIGS. 6 and 7.

Figure 6:
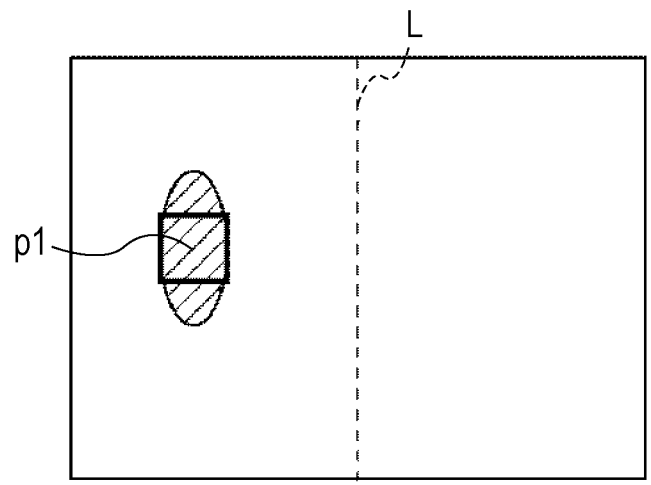
FIG. 6 shows an exemplary image obtained when a person is shot from above through a camera (a front frame).
Figure 7:
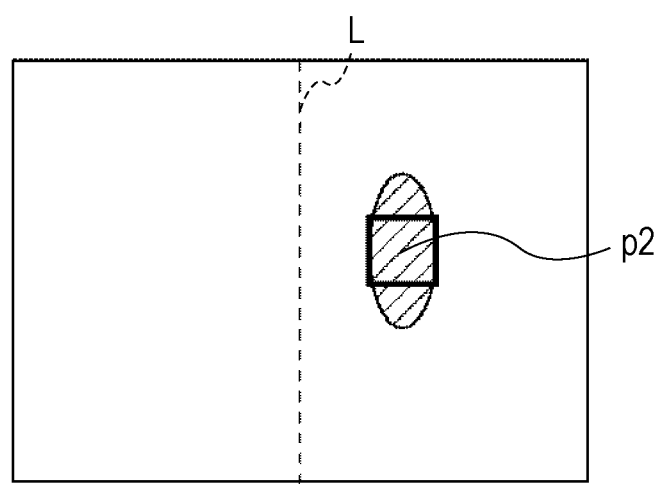
FIG. 7 shows another exemplary image obtained when the person is shot from above through the camera (a rear frame).

FIGS. 6 and 7 show the images of a person shot from directly above in two frames over a time period. In each of FIGS. 6 and 7, a diagonally shaded area indicates the person and a rectangle indicates the person's head, where data of the diagonally shaded area and the rectangle is detected by the object identification unit 40. When a straight line coupling the object position shown in the front frame (the barycenter of the rectangle area, which is designated by the sign p1 shown in FIG. 6), with the object position shown in the rear frame (the barycenter of the rectangle area, which is designated by the sign p2 shown in FIG. 7) crosses a predetermined line (designated by the sign L shown in each of FIGS. 6 and 7), the identification-result analysis unit 50 performs counting. For example, in examples shown in FIGS. 6 and 7, it is determined that the person moves from the left to the right so that the counting is performed. Then, data of the counting result is stored, and displayed on the display unit 126.

In the above-described embodiments, the processing procedures performed to count the number of people based on the object identification result corresponding to the two frames. However, the number of people may be counted based on the object identification result corresponding to three frames. In that case, even though it has often been difficult for the object identification unit 40 to detect an object that should be identified, the object identification unit 40 can detect objects with increased precision.

The processing procedures corresponding to steps S105 to S108 are repeatedly performed during the imaging operations. The processing procedures are terminated upon receiving an instruction to terminate the operations, the instruction being transmitted from the input unit 124.

Hereinafter, operations performed when a change is made based on an instruction transmitted from the input unit 124 so that the person is shot from the front in the exemplary state shown in FIG. 3 and counted will be described.

Figure 3:
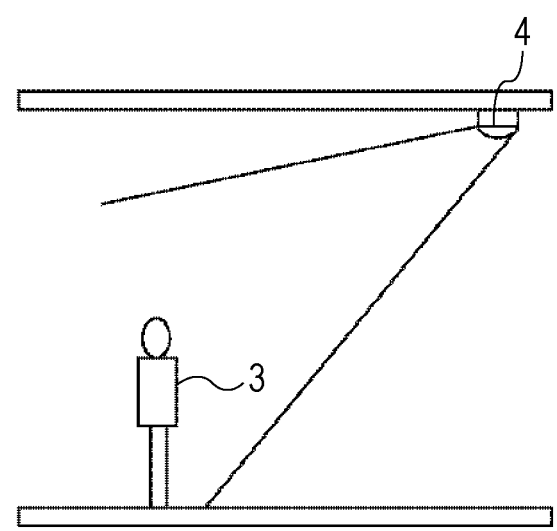
FIG. 3 is a diagram illustrating the state where a person is shot from front through a camera.
Figure 4:
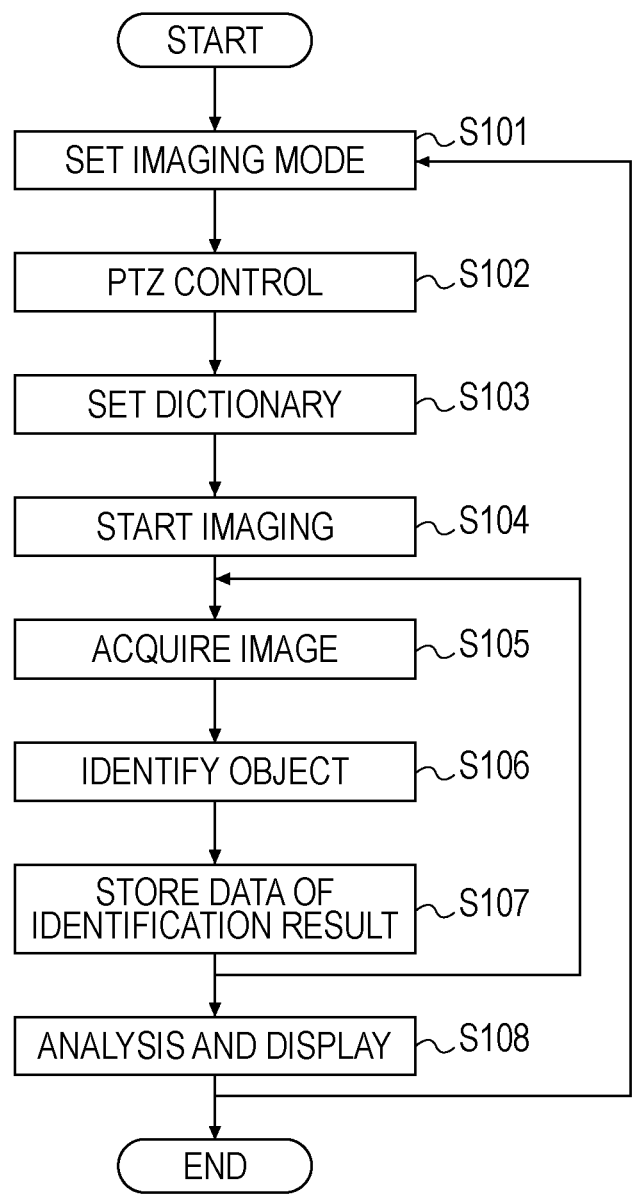
FIG. 4 is a flowchart illustrating processing procedures performed to detect an object.

First, returning to step S101, the imaging-mode setting unit 80 selects the imaging-from-front mode as its imaging mode, so as to shoot the person from the front in the exemplary state shown in FIG. 3.

Next, at step S102, the PTZ control unit 20 drives the imaging unit 10 so that the image pickup unit 10 shoots the area in front of the image pickup unit 10 based on the imaging mode set at step S101.

Next, at step S103, the dictionary setting unit 70 transfers the data of the "dictionary provided to identify the face pattern", the data being stored in the object-dictionary storage unit 60, to the internal dictionary memory based on the imaging mode selected at step S101, and sets the dictionary data to the object identification unit 40.

Next, the image pickup unit 10 starts imaging based on an instruction transmitted from the input unit 124 at step S104. After that, the processing procedures corresponding to steps S105 to S108 are performed, as described above.

In the above-described embodiment, the object identification unit 40 identifies the head shapes and faces by switching between data of the "dictionary provided to identify faces" and that of the "dictionary provided to identify the patterns of persons viewed from directly above". More specifically, since each of the size of pattern data cut from image data, the number of the classifiers used to perform checking, and data used for the checking performed by the classifier varies based on the imaging mode. Therefore, a change is made so that the above-described data items are used as the dictionary data.

Thus, in the above-described embodiment, the imaging direction of the camera and the dictionary of the identification target are set in association with each other based on the imaging mode of the camera. Therefore, even though the condition for installing the camera is changed, it becomes possible to easily switch over to an appropriate identification function.

Figure 8:
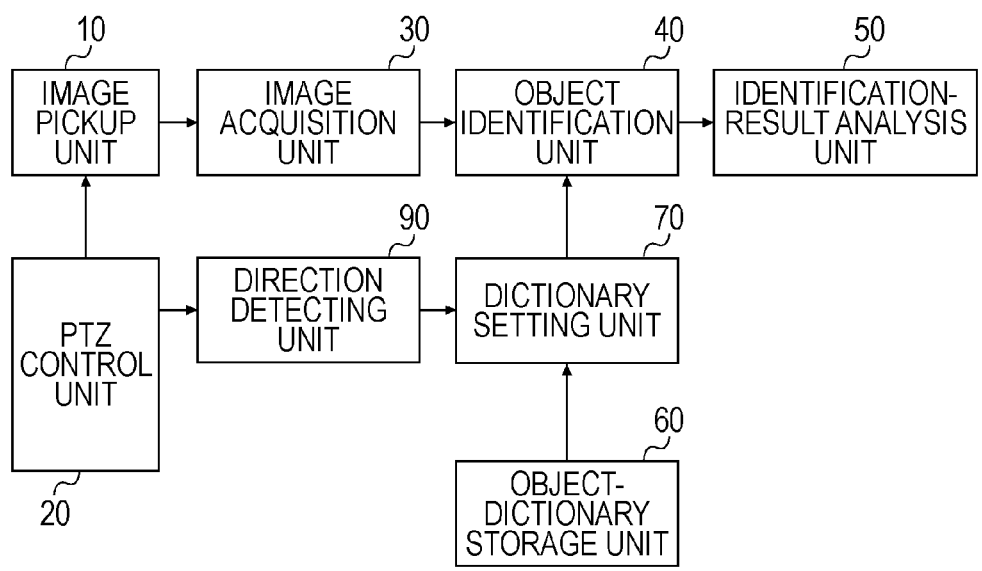
FIG. 8 is a diagram illustrating the functional configuration of another object detecting device.
Figure 9:
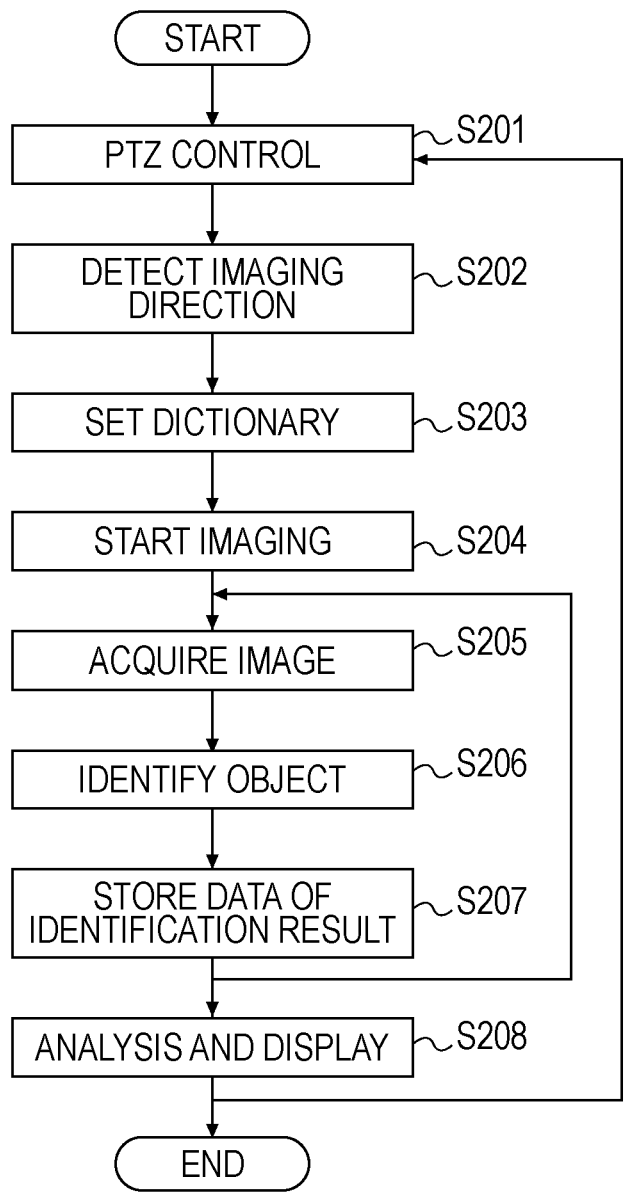
FIG. 9 is a flowchart showing processing procedures performed to detect an object.

According to the configuration of the above-described first embodiment, the imaging-lens driving amount and the dictionary used to perform the identification processing can be easily set in relation to the imaging mode. However, the configuration of the present invention is not limited to the above-described configuration. Therefore, according to a second embodiment of the present invention, the direction of the imaging lens is detected and the dictionary used to perform the identification processing is switched over to another based on the detected direction. FIG. 8 shows a configuration of the second embodiment and FIG. 9 shows a flowchart of processing procedures performed according to the second embodiment.

First, the configuration of the second embodiment will be described based on FIG. 8. In FIG. 8, the same components as those shown in FIG. 1 are designated by the same reference numerals. Namely, an imaging-direction detecting unit 90 is the only one component which is not used in the first embodiment. The imaging-direction detecting unit 90 includes a position sensor provided to detect the position of the PTZ control unit 20 driven by a motor or the like and a conversion unit provided to convert data output from the position sensor to imaging-direction data.

Next, the processing procedures performed according to the second embodiment will be described based on FIG. 9. In the second embodiment, operations of the PTZ control performed at step S201, the imaging-direction detection performed at step S202, and the dictionary setting performed at step S203 are different from those performed in the first embodiment. On the other hand, steps S204, S205, S206, S207, and S208 are equivalent to steps S104 to S108 that are performed in the first embodiment.

First, at step S201, the PTZ control unit 20 drives the image pickup unit 10 so that the image pickup unit 10 points a desired imaging direction based on operation data transmitted from the input unit 124. For example, for performing the same imaging as that performed in the imaging-from-above mode described in the first embodiment, the imaging unit 10 is driven so that the imaging unit 10 points directly below the imaging unit 10.

Next, at step S202, the imaging-direction detection unit 90 detects data of the position of the PTZ control unit 20, converts the position data into imaging-direction data, and transmits the imaging-direction data to the dictionary setting unit 70.

Next, at step S203, the dictionary setting unit 70 selects the dictionary data corresponding to the imaging-direction data based on the imaging-direction data transmitted from the imaging-direction detection unit 90, transfers the selected dictionary data to the dictionary memory provided in the object identification unit 40, and sets the dictionary data to the object-identification unit 40.

Further, when the imaging-direction data corresponds to a direction determined so that the image pickup unit 10 points a directly-below direction, the dictionary setting unit 70 makes settings so that the data of the "dictionary provided to identify the patterns of persons viewed from directly above" is used, the data being stored in the object-dictionary storage unit 60 in advance. Further, when the imaging-direction data corresponds to a direction determined so that the image pickup unit 10 points a forward direction, the dictionary setting unit 70 makes settings so that the data of the "dictionary provided to identify faces" is used, the data being stored in the object-dictionary storage unit 60 in advance.

Since the operations performed at steps S204 to S208 are equivalent to those performed at steps S104 to S108 that are described in the first embodiment, the description thereof is omitted.

Thus, in the above-described embodiment, data of the imaging direction of the camera is detected and the data of the dictionary for the identification target is set in relation to the detection result. Therefore, even though the condition for installing the camera is changed, it becomes possible to easily switch over to an appropriate identification function.

Figure 10:
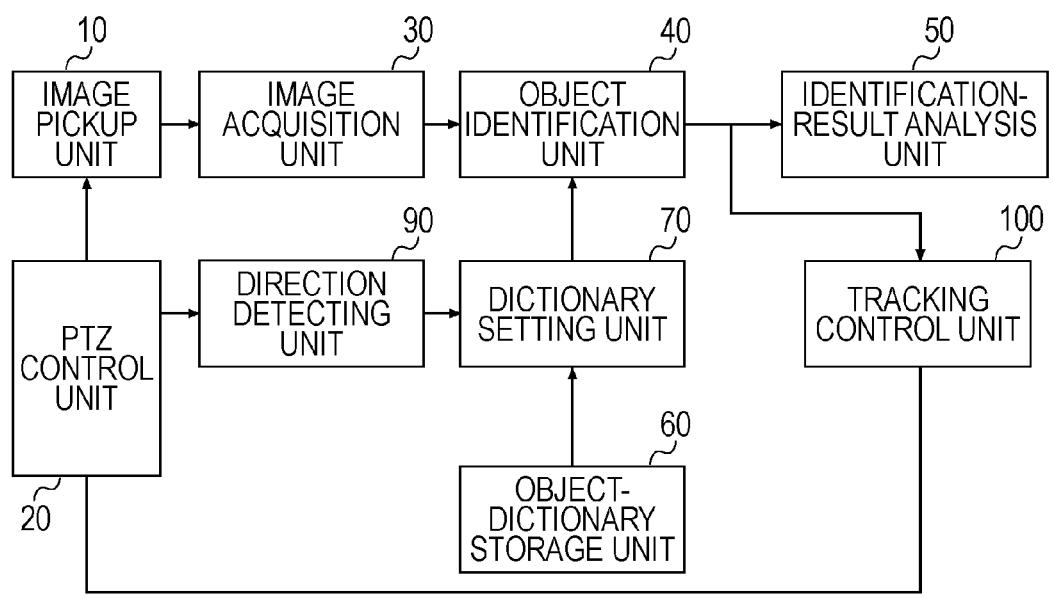
FIG. 10 is a diagram illustrating the functional configuration of another object detecting device.
Figure 11:
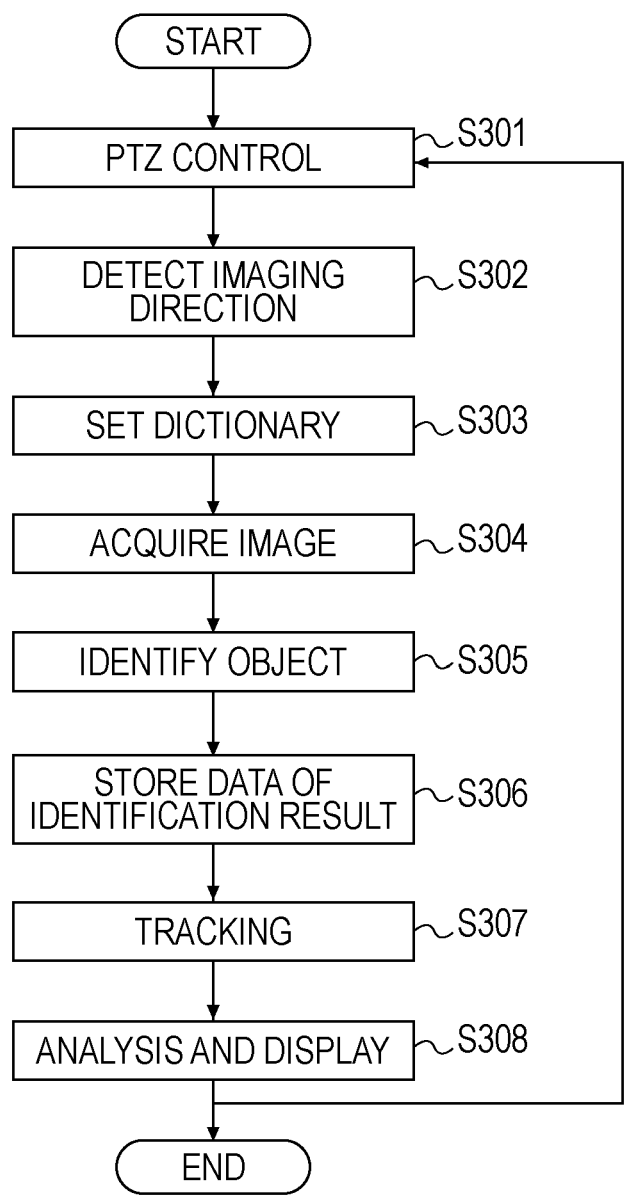
FIG. 11 is a flowchart showing processing procedures performed to detect an object.

In the first and second embodiments, the control of the imaging direction of the camera and the setting of the dictionary of the identification target are performed in association with each other before the imaging is started. However, the configuration of the present invention is not limited to the above-described embodiments. According to a third embodiment of the present invention, a person is identified during imaging, the imaging direction of the camera is controlled so that the person is tracked based on the motion of the identified person, and the dictionary of the identification target is set in relation to a change in the imaging direction, the change being made during the tracking. FIG. 10 shows a configuration of the third embodiment and FIG. 11 shows a flowchart of processing procedures performed according to the third embodiment.

First, the configuration of the third embodiment will be described with reference to FIG. 10. In FIG. 10, the same components as those shown in FIG. 8 are designated by the same reference numerals. Namely, a track control unit 100 is the only one component which is not used in the first and second embodiments. The track control unit 100 obtains data of the parameter of the imaging direction (pan and tilt) so that the person identified by the object identification unit 40 comes to the center of the image, and transmits the parameter data to the PTZ control unit 20.

Next, operations of the third embodiment will be described with reference to FIG. 11. Here, steps S301 to S303 are equivalent to steps S201 to S203 that are performed in the second embodiment. Further, steps S304 to S306 are equivalent to steps S105 to S107 that are performed in the first embodiment and steps S205 to S207 that are performed in the second embodiment. On the other hand, operations of an analysis and display that are performed at step S307 and tracking performed at step S308 are different from those performed in the first and second embodiments.

First, at step S301, the PTZ control unit 20 drives the image pickup unit 10 so that the image pickup unit 10 points a desired imaging direction based on data of an operation, the operation data being transmitted from the input unit 124. Then, at step S302, the imaging-direction detection unit 90 detects the position of the PTZ control unit 20 and transmits the imaging direction data to the dictionary setting unit 70. Then, at step S303, the dictionary setting unit 70 selects the dictionary data corresponding to the imaging-direction data based on the imaging-direction data transmitted from the imaging-direction detection unit 90, transfers the selected dictionary data to the dictionary memory provided in the object identification unit 40, and sets the selected dictionary data to the object identification unit 40.

Next, at step S304, the image acquisition unit 30 acquires data of images picked up by the image pickup unit 10 at predetermined time intervals. Then, at step S305, the object identification unit 40 checks the image data transferred to the internal image memory against the dictionary data set by the dictionary setting unit 70, so as to identify a desired object. Then, at step S306, data of the positional coordinates of the area of the object detected through the object identification unit 40 is transmitted to the identification-result analysis unit 50, and the identification-result analysis unit 50 temporarily stores the positional coordinate data in the internal memory.

Next, at step S307, the track control unit 100 obtains data of the parameter of the imaging direction so that the person identified by the object identification unit 40 comes to the center of the image, and transmits the parameter data to the PTZ control unit 20. Namely, data of the parameter of the imaging direction (pan and tilt) controlled by the PTZ control unit 20 so that the person identified from the positional coordinates of the object area data output from the object identification unit 40 comes to the center of the image is obtained. Then, the obtained parameter data is transmitted to the PTZ control unit 20 so that the imaging unit 10 changes the imaging direction and tracks the person.

Then, at step S308, the identification-result analysis unit 50 counts the number of people when the object identification result and the imaging direction satisfy predetermined conditions. In the above-described embodiment, the number of people is counted when the imaging direction of the image pickup unit 10 points from above to directly below. Further, images picked up at that time are shown in FIGS. 6 and 7. When the position of a person moves from the barycenter p1 shown in FIG. 6 to the barycenter p2 shown in FIG. 7 with reliability, it is determined that the person travels from the left to the right and the person is counted.

Similarly, the processing procedures corresponding to steps S301 to S308 are performed again in frames of the next time. Then, the processing procedures are terminated when an instruction to terminate the operations is transmitted from the input unit 124.

In the third embodiment, the above-described operations are repeated as below with the passage of time for a case where the person approaches the camera.

First, at the initial setting time, the imaging direction of the camera and the identification target of the camera are equivalent to those specified when the imaging-from-front mode described in the first embodiment is selected. Namely, at step S301, the imaging direction of the camera is controlled so that imaging is performed from the front, as shown in FIG. 3. Further, as a result of the detection performed at step S302, the dictionary setting is performed so that the object identification unit 40 identifies the face pattern at step S303. Then, as a result of the processing procedures performed at steps S304 to S307, a person identified by the camera is captured at the center of the next frame. However, since the person moves to a position directly below the camera with the passage of time, the camera is controlled so that the camera points the position directly below the camera.

At step S303, the dictionary setting is performed so that the face pattern is identified in the area of a predetermined imaging direction and the pattern of a person viewed from directly above is identified in the area of another predetermined imaging direction. Further, it is arranged that switching between the dictionaries is automatically done on an appropriate border between the imaging directions. It may be arranged that both the patterns are identified in an area located midway between the imaging directions.

Thus, in the above-described embodiment, a person is identified during imaging and the person is tracked based on the movement of the identified person. Therefore, it becomes possible to count the number of only people who passed a predetermined position with reliability. Further, at that time, the setting of the dictionary of the identification target is performed in accordance with the control of the imaging direction of the camera. Therefore, even though the person is viewed differently in accordance with the imaging direction of the camera, the person identification can be achieved with precision.

In the above-described embodiments, the person is identified through the camera and the number of people who passed through the predetermined area is counted. However, the scope of application of the present invention is not limited to the above-described embodiments. For example, the number of other objects such as vehicles may be counted. Further, the present invention can be broadly applied when the detection target varies in accordance with the imaging direction of the camera, as in the case where the detection target includes a person and a vehicle, for example.

An imaging condition for switching over to another identification target may be not only the imaging direction, but the imaging magnification. For example, when the camera is shooting a person under low magnification, so as to identify the person through the camera, it may be arranged that the body (the entire body) of the person is identified. Further, when the camera is shooting the person under high magnification, it may be arranged that the face of the person is identified.

In the above-described embodiments, the identification method is switched over to another by switching between the identification dictionaries for different identification targets. However, it may be configured that identification processing programs varying with the identification targets are provided, so as to switch between the identification processing programs.

In the above-described embodiments, it becomes possible to detect an object by using an appropriate identification method in accordance with the imaging condition. For example, if the object identification is performed by using the dictionary corresponding to the typical image pattern of an identification target in accordance with the imaging direction of the camera, it becomes possible to easily switch over to an appropriate identification function even though the object is shot from above and/or front.

The present invention can be achieved by a CPU reading program code of software implementing the functions of the above-described embodiments from a computer-readable storage medium and executing the program code.

In that case, the read program code itself achieves the functions of the above-described embodiments and the computer-readable storage medium showing the program code constitutes another embodiment of the present invention. Various types of mediums can be used, as the computer-readable storage medium.

Further, according to another embodiment of the present invention, an operating system (OS) running on a computer executes part of or the entire processing based on instructions of the program code read by the CPU so that the functions of the above-described embodiments are achieved.

Although the present invention has been described in its preferred from with a certain degree of particularity, many apparently widely different embodiments of the present invention can be made without departing from the spirit and the scope thereof. It is to be understood that the invention is not limited to the specific embodiments thereof except as defined in the appended claims. The scope of the following claims is to be accorded the broadest interpretation so as to encompass all modifications and equivalent structures and functions.

This application claims the benefit of Japanese Patent Application No. 2008-086960 filed on Mar. 28, 2008, which is hereby incorporated by reference herein in its entirety.

What is claimed is:

1. An object detecting method comprising the steps of:
   determining a position of an image pickup unit relative to a predetermined object to be picked up by the image pickup unit;
   selecting an identification dictionary corresponding to the determined position relative to the predetermined object for identifying a pattern of the predetermined object picked up from the determined position of the image pickup unit relative to the predetermined object, from among a plurality of identification dictionaries each of which corresponds to a respective one of a plurality of positions relative to the predetermined object for identifying a pattern of the predetermined object picked up from the respective one of the plurality of positions relative to the predetermined object;

picking up an image of the predetermined object by the image pickup unit from the determined position; and detecting at least one pattern of the predetermined object from the image picked up from the determined position using the selected identification dictionary.

2. The object detecting method according to claim 1, further comprising the step of counting a number of the detected at least one predetermined object from images consecutively picked up through the image pickup unit.

3. The object detecting method according to claim 1, wherein, at the determining step, the imaging direction is determined based on imaging mode specified by a user.

4. The object detecting method according to claim 1, wherein, at the determining step, the imaging direction is determined by detecting a state of the image pickup unit.

5. The object detecting method according to claim 4, further comprising the step of tracking the detected predetermined object,
  wherein, at the determining step, the imaging direction is determined by detecting the state of the image pickup unit during the tracking.

6. An object detecting device comprising:
  a memory configured to store a program; and
  a processor configured to execute the program to provide:
    a determining unit configured to determine a position of an image pickup unit relative to a predetermined object to be picked up by the image pickup unit;
    a selecting unit configured to select an identification dictionary corresponding to the determined position relative to the predetermined object for identifying a pattern of the predetermined object picked up from the determined position of the image pickup unit relative to the predetermined object, from among a plurality of identification dictionaries each of which corresponds to respective one of a plurality of positions relative to the predetermined object for identifying a pattern of the predetermined object picked up the from respective one of the plurality of positions relative to the predetermined object; and
    a detecting unit configured to detect at least one pattern of the predetermined object from the image picked up from the determined position using the selected identification dictionary,
  wherein an image is picked up of the predetermined object by the image pickup unit from the determined position.

7. A non-transitory computer-readable storage medium containing computer-executable instructions that perform object detection, the medium comprising:
  computer-executable instructions for determining a position of an image pickup unit relative a predetermined object to be picked up by the image pickup unit;
  computer-executable instructions for selecting an identification dictionary corresponding to the determined position relative to the predetermined object for identifying a pattern of the predetermined object picked up from the determined position of the image pickup unit relative to the predetermined object from among a plurality of identification dictionaries each of which corresponds to respective one of a plurality of positions relative to the predetermined object for identifying a pattern of the predetermined object picked up from the respective one of the plurality of positions relative to the predetermined object;
  computer-executable instructions for picking up an image of the predetermined object by the image pickup unit from the determined position; and
  computer-executable instructions for detecting at least one pattern of the predetermined object from the image picked up from the determined position using the selected identification dictionary.

* * * * *